S. POTTS.
EDUCATIONAL SOUVENIR.
APPLICATION FILED OCT. 23, 1914.

1,127,276.

Patented Feb. 2, 1915.

WITNESSES:
F. E. Maynard
Annie Linnett

INVENTOR
Stacy Potts
BY G. H. Strong.
ATTORNEY

UNITED STATES PATENT OFFICE.

STACY POTTS, OF VALLEJO, CALIFORNIA.

EDUCATIONAL SOUVENIR.

1,127,276.  Specification of Letters Patent.  Patented Feb. 2, 1915.

Application filed October 23, 1914.  Serial No. 868,245.

*To all whom it may concern:*

Be it known that I, STACY POTTS, a citizen of the United States, residing at Vallejo, in the county of Solano and State of California, have invented new and useful Improvements in Educational Souvenirs, of which the following is a specification.

This invention relates to an article of manufacture in the nature of educational souvenirs and particularly to a compressible geographical sphere.

It is an object of this invention to provide a combined souvenir and amusement device.

Another object is to provide a compressible, resilient sphere having formed or delineated on its surface a map, picture or other subject matter, and to provide the sphere with an aperture for the induction of a charge of water or other liquid and with a substantially invisible orifice through which the water may be ejected upon the compression of the ball when the induction aperture is closed.

It is a particular object of this invention to provide an article which will be at once educational by the subject matter thereon and also amusing by reason of the combination with the subject matter of ludicrous features.

The invention consists of the parts and the construction and combination of parts as hereinafter more fully described and claimed, having reference to the accompanying drawings, in which—

Figure 1:
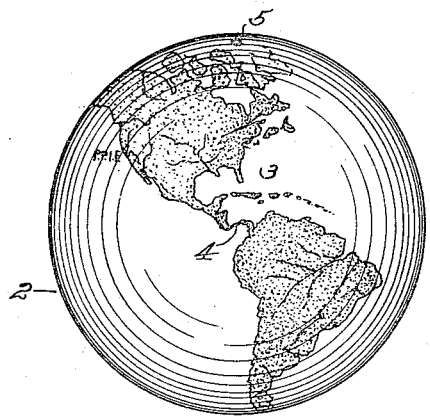
Figure 2:
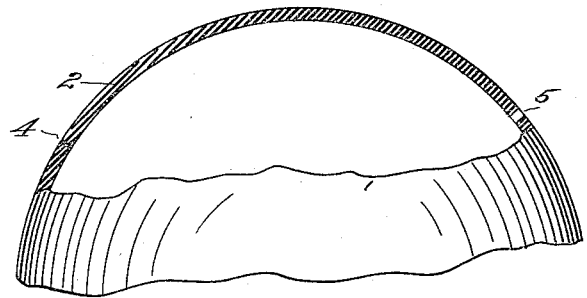

Figure 1 is a side view of the article. Fig. 2 is an enlarged sectional detail, the slit being exaggerated.

2 represents a hollow globe of rubber, or other suitable material, which is compressible and resilient. On its exterior surface may be delineated, printed, embossed, molded, or in any way produced, a subject matter of desired character, here shown as a map 3 of the western hemisphere. The surface may be lettered or otherwise provided with symbols indicating a place or event which it may be desired to commemorate. Thus at the approximate location of San Francisco may be placed the letters P. P. I. E. indicating the Panama-Pacific International Exposition, thus associating the ball as a souvenir of that event.

To render the device instructive of the location of the Panama Canal the isthmus is severed by a substantially invisible slit 4 through the wall of the ball. At the location of the North Pole is provided an aperture 5. By immersing the ball and compressing it, air will be displaced and upon the release of pressure water will be drawn in through the aperture as the ball resumes its normal shape. Then to locate the Panama Canal the finger is placed upon the North Pole and pressed down, whereupon water will be sprayed through the slit 4 at the isthmus.

It is understood that while I have shown the western hemisphere in this embodiment, that any other subject may be substituted as for instance a map of Yellowstone Park with the slit 4 at the location of the geyser, or a map of Texas with the slit at an oil "gusher," or a map of Hawaii with the slit at Mona Loa.

Having thus described my invention, what I claim and desire to secure by Letters Patent is—

1. A compressible, resilient, hollow body of suitable shape having on its exterior surface suitable illustrative subject-matter, the wall of the body being pierced by an aperture for the induction of a liquid and having a substantially invisible slit in coördinate relation with said subject-matter and through which the liquid will be ejected when the filling aperture is covered and the body compressed.

2. A combined souvenir, educational and amusement device comprising a compressible, resilient, hollow sphere, and instructive subject-matter on its exterior surface, said sphere having an aperture for the introduction of liquid and having a substantially invisible slit in coördinate relation with the subject-matter and through which the liquid will be ejected when said aperture is covered and the sphere compressed.

3. A combined souvenir, educational and amusement device comprising a compressible, resilient, hollow sphere, and instructive subject-matter on its exterior surface, including symbols of an indicative character, said sphere having an aperture for the introduction of liquid and having a substantially invisible slit in coördinate relation with the subject-matter and through which the liquid will be ejected when said aperture is covered and the sphere compressed.

4. A hollow resilient ball on which appears a representation of North and South America, the ball having a narrow, self-closing slit at the Isthmus of Panama through which will be ejected a liquid on the compression of the ball.

In testimony whereof I have hereunto set my hand in the presence of two subscribing witnesses.

STACY POTTS.

Witnesses:
JOHN H. HERRING,
W. W. HEALEY.